US012560284B2

(12) United States Patent
Philippe et al.

(10) Patent No.: US 12,560,284 B2
(45) Date of Patent: Feb. 24, 2026

(54) VALVE FOR PRESSURIZED FLUID AND A CONTAINER OR A SET OF CONTAINERS FOR PRESSURIZED FLUID

(71) Applicant: L'Air Liquide, Societe Anonyme pour l'Etude et l'Exploitation des Procedes Georges Claude, Paris (FR)

(72) Inventors: Louis Philippe, Jouy en Josas (FR); Herve Paoli, Jouy en Josas (FR); Samuel Vignerol, Sassenage (FR); Johan Broechler, Lintgen (LU); Claudio Difilippo, Lintgen (LU)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 30 days.

(21) Appl. No.: 18/834,961

(22) PCT Filed: Jan. 24, 2023

(86) PCT No.: PCT/EP2023/051635
§ 371 (c)(1),
(2) Date: Jul. 31, 2024

(87) PCT Pub. No.: WO2023/148048
PCT Pub. Date: Aug. 10, 2023

(65) Prior Publication Data

US 2025/0137596 A1 May 1, 2025

(30) Foreign Application Priority Data

Feb. 4, 2022 (FR) ....................................... 2201003

(51) Int. Cl.
*F17C 13/04* (2006.01)

(52) U.S. Cl.
CPC ...... *F17C 13/04* (2013.01); *F17C 2201/0109* (2013.01); *F17C 2201/032* (2013.01);
(Continued)

(58) Field of Classification Search
CPC ... Y10T 137/1632; F16K 13/04; F16K 17/14; F17C 2201/0109; F17C 2201/032;
(Continued)

(56) References Cited

U.S. PATENT DOCUMENTS 2,249,848 A * 7/1941 O'Brien .................... E03B 9/02
137/272
3,930,517 A 1/1976 Gagala
(Continued)

FOREIGN PATENT DOCUMENTS

EP 3 692 285 9/2021
EP 3 913 276 11/2021
(Continued)

OTHER PUBLICATIONS

Machine Translation of FR 759375A retrieved from espacenet.com (Year: 2025).*
International Search Report and Written Opinion for PCT/EP2023/051635, mailed Mar. 24, 2023.
French Search Report for FR 2 201 003, mailed Sep. 8, 2022.

*Primary Examiner* — Jessica Cahill
(74) *Attorney, Agent, or Firm* — Allen E. White

(57) ABSTRACT

The invention relates to a valve for pressurized fluid, the valve having a body incorporating a fluid circuit having an upstream end and a downstream end, the circuit having a seal valve, the seal valve enabling the circuit to be opened or closed, the valve having a member for controlling the seal valve, the seal valve being slidably mounted in the body so as to slide between a position in which the circuit is closed when the control member is in a rest position and a position in which the circuit is open when the control member is in an active position, the valve having a deformable member
(Continued)

positioned between the seal valve and the control member. The invention also relates to a container or a set of containers for pressurized fluid comprising such a valve.

11 Claims, 2 Drawing Sheets

(52) U.S. Cl.
CPC ................. *F17C 2205/0314* (2013.01); *F17C 2205/0329* (2013.01); *F17C 2205/0332* (2013.01); *F17C 2205/0382* (2013.01); *F17C 2205/0394* (2013.01); *F17C 2221/018* (2013.01); *F17C 2223/0123* (2013.01); *F17C 2223/036* (2013.01); *F17C 2260/042* (2013.01); *Y10T 137/1632* (2015.04)

(58) Field of Classification Search
CPC ........ F17C 2221/018; F17C 2223/0123; F17C 2223/036; F17C 2260/042; F17C 2205/0314; F17C 2205/0329; F17C 2205/0332; F17C 2205/0382; F17C 2205/0394
USPC ....................................................... 137/68.11
See application file for complete search history.

(56) References Cited

U.S. PATENT DOCUMENTS

| | | | | | |
|---|---|---|---|---|---|
| 4,562,852 | A | | 1/1986 | Britt | |
| 4,907,617 | A | * | 3/1990 | Whalen | F16K 17/406 137/71 |
| 5,103,853 | A | * | 4/1992 | McGushion | F17C 13/123 137/71 |
| 5,941,268 | A | * | 8/1999 | Ross, Jr. | F17C 13/04 137/71 |
| 6,321,770 | B1 | * | 11/2001 | Hintzman | F16K 31/56 137/71 |
| 7,128,083 | B2 | * | 10/2006 | Fleury, Jr. | F16K 47/023 137/71 |
| 11,560,966 | B2 | * | 1/2023 | Vignerol | F16K 35/14 |
| 2014/0261748 | A1 | * | 9/2014 | Smith | F16K 17/403 137/68.11 |

FOREIGN PATENT DOCUMENTS

| | | | | |
|---|---|---|---|---|
| FR | 759375 | A | * | 2/1934 |
| FR | 3 108 382 | | | 9/2021 |

* cited by examiner

VALVE FOR PRESSURIZED FLUID AND A CONTAINER OR A SET OF CONTAINERS FOR PRESSURIZED FLUID

CROSS-REFERENCE TO RELATED APPLICATIONS

This application is a § 371 of International PCT Application PCT/EP2023/051635, filed Jan. 24, 2023, which claims § 119 (a) foreign priority to French patent application FR 2201003, filed Feb. 4, 2022.

BACKGROUND

Field of the Invention

The invention relates to a valve for pressurized fluid and to a tank or collection of tanks for pressurized fluid.

Related Art

A valve for a pressurized fluid comprising a body incorporating a fluid circuit having an upstream end configured to be placed in communication with at least one tank for pressurized fluid and a downstream end configured to be placed in communication with a user of fluid, the circuit comprising a shut-off member mounted slidably in the body, the shut-off member allowing the circuit to be closed or opened, the valve comprising a shut-off member control member, the shut-off member being mounted in the body with the ability to slide between a position in which the circuit is closed when the control member is in a position of rest, and a position in which the circuit is open when the control member is in an active position, is already known from the prior art, for example from patent EP 3 692 285 B1.

One problem with valves of this type is the risk of deformation of the shut-off member when it is in the position in which the circuit is open while at the same time an undesirable event due to the pressurized fluid occurs upstream. Specifically, for example, when an explosive and exothermic decomposition occurs in the circuit upstream of the shut-off member while the shut-off member is in the position in which the circuit is open, the shut-off member may experience deformation, particularly buckling, which then prevents the valve from being closed for example by a user as a result of the fact that the shut-off member is no longer able to slide into the position in which the circuit is closed. Such a failure to close may then generate a risk of fire or of explosion, for example when the pressurized fluid is acetylene.

U.S. Pat. No. 3,930,517 A describes a valve for a pressurized fluid having a mechanism for closing the shut-off member if the valve should break. In the event of breakage, there is a risk that the body of the valve will become damaged.

SUMMARY OF THE INVENTION

An objective of the invention is to overcome all or some of the above-mentioned disadvantages of the prior art. Thus, a notable objective of the invention is to allow the circuit to close automatically when an undesirable event due to the pressurized fluid occurs in the part of the circuit upstream of the shut-off member.

To this end, one subject of the invention is a valve for a pressurized fluid, comprising a body incorporating a fluid circuit having an upstream end configured to be placed in communication with at least one tank of pressurized fluid and a downstream end configured to be placed in communication with a user of fluid, the circuit comprising a shut-off member mounted with the ability to slide in the body, the shut-off member allowing the closing or opening of the circuit,

- the valve comprising a shut-off member control member controlling the valve shut-off member, the shut-off member being mounted with the ability to slide in the body between a position in which the circuit is closed when the control member is in a position of rest, and a position for opening the circuit when the control member is in an active position,
- the valve comprising a deformable member interposed between the shut-off member and the control member, the deformable member being configured, when the control member is in the active position,
- to press against the shut-off member and cause it to slide into the position in which the circuit is open, and
- to deform irreversibly under the action of the shut-off member when a force applied by the pressurized fluid to the shut-off member exceeds a predetermined threshold, and thus allow the shut-off member to slide into the position in which the circuit is closed.

According to other optional features of the valve, considered alone or in combination:

- The control member is a manual or automatic control member.
- The position of rest of the control member is stable and the active position of the control member is stable.
- The control member comprises a pusher sliding in the body, the deformable member being interposed between the pusher and the shut-off member.
- The pusher is made of metal.
- When the control member is in the active position, the pusher presses against the body.
- The deformable member is formed based on plastics material.
- The deformable member is a hollow insert, placed in a housing of the pusher.
- The hollow insert is pot-shaped with its opening facing toward the closed end of the housing of the pusher and its closed end, the opposite end from the opening, configured to press against the shut-off member and cause it to slide into the position in which the circuit is open when the control member is in the active position.
- The thickness of the closed end of the hollow insert is comprised between 1 mm and 4 mm, preferably comprised between 1.8 mm and 2.2 mm, more preferentially equal to 2 mm. Thus, with such sizing, even after thousands of valve opening and closing cycles, there is no risk of the closing being worn away by friction against the shut-off member.
- The valve is of the self-closing type.
- The shut-off member is at least partially positioned upstream of a valve seat of the body such that the pressure of the fluid in the upstream end contributes to keeping the shut-off member in its closed position, in contact with the valve seat via a seal.
- The valve shut-off member comprises a stem slidably mounted in the body and a head of a shape that complements that of the valve seat of the body, the head being positioned upstream of the valve seat, the stem being mounted downstream of the head.
- The predetermined threshold is below the minimum buckling force—also known as "Euler's critical buckling load"—for the stem.

The hollow formed in the hollow insert is of cylindrical shape and has a diameter greater than that of the stem of the shut-off member.

The depth of the hollow is greater than the travel of the stem between the position which the circuit is open and the position in which the circuit is closed.

The seal is borne by the shut-off member or by the valve seat.

The seal is made from an elastomer and/or thermoplastic material.

The seal is made of thermoplastic elastomer polyester, preferably of Hytrel (registered trade name).

The stem is made of metal, preferably of stainless steel or of brass.

The valve comprises a first return member for returning the shut-off member to the closed position.

The first return member is a first spring positioned between the body and the shut-off member. Thus, when the valve is in the closed position, the first spring applies a force additional to that of the fluid that holds the shut-off member against the valve seat.

The sum of the predetermined threshold and of the force exerted by the first spring on the shut-off member when the shut-off member is in the position in which the circuit is open is less than the minimum buckling force for the stem.

The valve comprises a second return member for returning the pusher to the position of rest of the control member.

The second return member is a second spring positioned between the body and the pusher. Thus, when the valve moves from the open position to the closed position, the second spring applies a force which tends to return the pusher and thus the control member to a position of rest.

The second spring is guided in the housing of the pusher.

The valve comprises a radial seal which is positioned between the stem and the body.

The pressurized fluid is gaseous, and preferably predominantly contains a combustible or oxidizing gas, more preferentially predominantly contains acetylene— or $C_2H_2$—, and even more preferentially still, contains at least 99% acetylene.

Another subject of the invention is a tank or collection of tanks for pressurized fluid, comprising a valve as described hereinabove.

According to other optional features of the tank or collection of tanks, considered alone or in combination:

The or each tank is a pressurized gas cylinder.

The pressurized gas predominantly contains a combustible or oxidizing gas, preferably predominantly contains acetylene, and more preferentially, contains at least 99% acetylene.

The filling pressure for the or each tank is at least 0.5 MPa, preferably at least 1.5 MPa.

BRIEF DESCRIPTION OF THE FIGURES

The invention will be better understood upon reading the following description, which is given solely by way of example and with reference to the appended drawings, in which.

DETAILED DESCRIPTION OF THE INVENTION

Throughout the figures, the same references relate to the same elements.

In this detailed description, the following embodiments are examples. Although the description refers to one or more embodiments, this does not mean that the features apply only to a single embodiment. Individual features of different embodiments can also be combined and/or interchanged to provide other embodiments.

Figure 1:
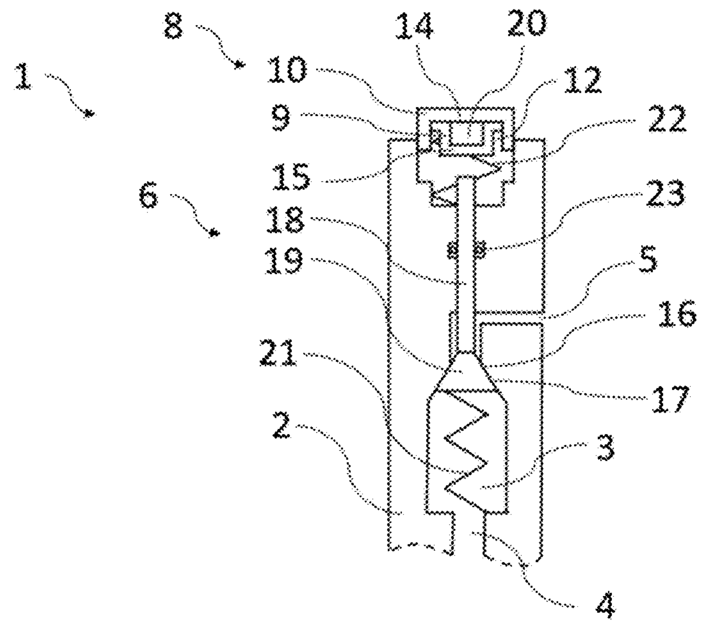
FIG. 1 FIG. 1 is a schematic cross-sectional view of a valve according to one embodiment of the invention, in which the control member is in the position of rest, with the circuit closed.
Figure 2:
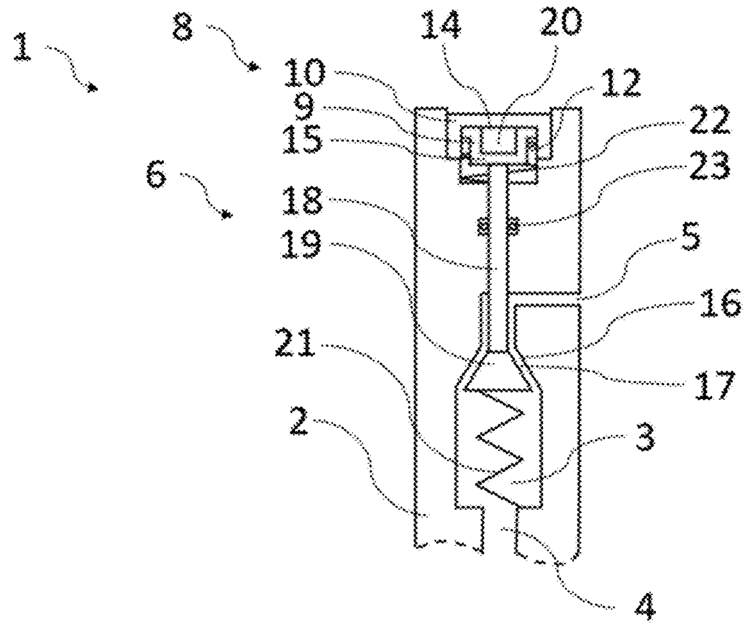
FIG. 2 FIG. 2 is a schematic cross-sectional view of the valve depicted in FIG. 1, in which the control member is in the active position, with the circuit open.
Figure 3:
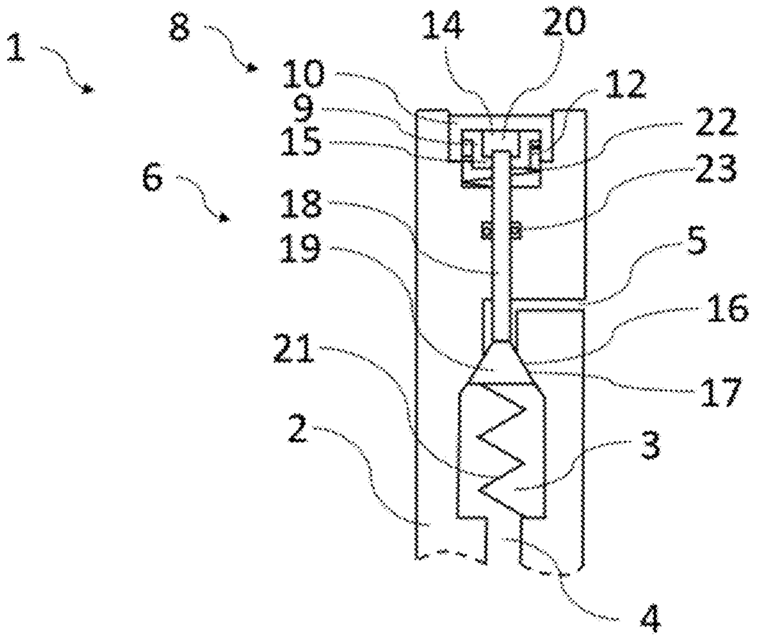
FIG. 3 FIG. 3 is a schematic cross-sectional view of the valve depicted in FIGS. 1 and 2, in which the control member is in the active position, with the circuit closed.

FIGS. 1 to 3 schematically depict a valve 1 for a pressurized fluid according to one embodiment, at various stages of operation. The valve 1 comprises a body 2 incorporating a fluid circuit 3. The body 2 is formed of metal, preferably made of stainless steel and/or brass. For reasons of assembly and fitting, the body 2 may be made up of several elements fixed together, for example fixed by screw-fastening, clamping or compression fitting. In the circuit 3, the pressurized fluid is gaseous, and preferably predominantly contains a combustible gas, more preferentially predominantly contains acetylene—or $C_2H_2$—, and even more preferentially still, contains at least 99% acetylene.

The circuit 3 has an upstream end 4 configured to be placed in communication with at least one tank of pressurized fluid, and a downstream end 5 configured to be placed in communication with a user of fluid. The circuit 3 also comprises a shut-off member 6 mounted with the ability to slide in the body 2.

The valve 1 also comprises a valve control member 8 controlling the shut-off member 6. The shut-off member 6 allows the circuit 3 to be closed or opened. More specifically, the shut-off member 6 is mounted with the ability to slide in the body 2 between a position for closing the circuit 3 when the control member 8 is in the position of rest, as depicted in FIG. 1, and a position for opening the circuit 3 when the control member 8 is in an active position, as depicted in FIG. 2. The position of rest of the control member 8 is stable and the active position of the control member 8 is stable. In other words, the valve 1 can neither open nor closed spontaneously; an action on the control member 8 is required in order to change over from the position of rest to the active position, and vice versa.

The valve 1 further comprises a deformable member 9 interposed between the shut-off member 6 and the control member 8. The deformable member 9 is configured, when the control member 8 is in the active position, to press against the shut-off member 6 and cause it to slide into the position for opening the circuit 3, as depicted in FIG. 2, and to deform irreversibly under the action of the shut-off member 6 when a force applied by the pressurized fluid to the shut-off member 6 exceeds a predetermined threshold. Thus, such irreversible deformation of the deformable member 9 allows the shut-off member 6 to slide into the position for closing the circuit 3, as depicted in FIG. 3.

The control member 8 is a manual or automatic control member. In the embodiment depicted in the figures, the control member 8 is a manual control member. The control member 8 comprises a pusher 10 sliding in the body 2, the deformable member 9 being interposed between the pusher 10 and the shut-off member 6. More specifically, when the control member 8 is in the active position, the pusher 10 presses against the body 2, as depicted in FIGS. 2 and 3. The pusher 10 is formed of metal, preferably of stainless steel and/or brass.

Figure 4:
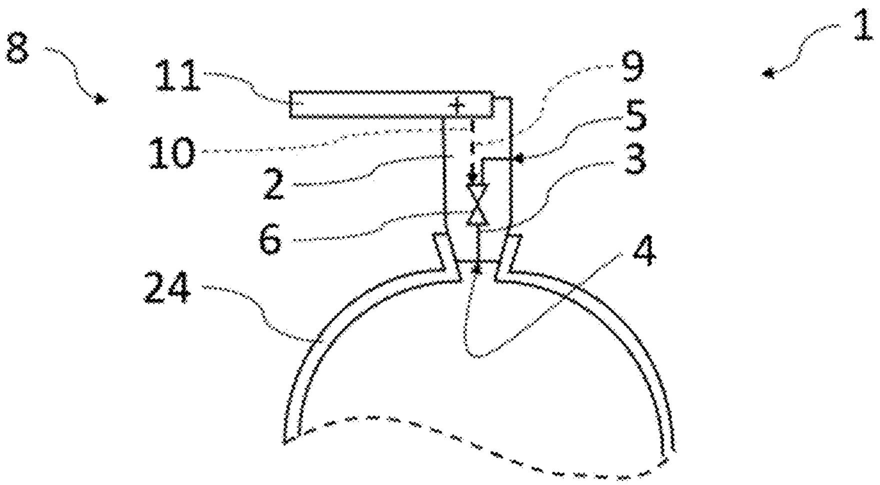
FIG. 4 FIG. 4 is a schematic cross-sectional view of a Tank equipped with a valve according to one embodiment of the invention, in which the control member is in the active position.

As depicted in FIG. 4, the control member 8 in this embodiment comprises a lever 11 mounted movably on the valve 1. Thus, when the control member 8 is in the position of rest, the lever 11 is also in a position of rest and the pusher 10 does not press against the body 2, as depicted in FIG. 1. When the lever 11 is moved into an active position, the control member 8 is then in the active position, and the pusher 10 slides in the body 2 and comes to press on the body 2, as depicted in FIG. 2. For example, in its active position, the free end of the lever 11 is raised, namely moved away from the body 2 of the valve 1, as depicted in FIG. 4.

In a variant which has not been depicted, the control member 8 is an automatic control member, preferably pneumatically operated.

In this embodiment, the deformable member 9 is formed based on plastics material. The deformable member 9 is a hollow insert, placed in a housing 12 of the pusher 10. The hollow insert is pot-shaped with its opening 14 facing toward the closed end of the housing 12 of the pusher 10 and its closed end 15, the opposite end from the opening 14, configured to press against the shut-off member 6 and cause it to slide into the position for opening the circuit 3 when the control member 8 is in the active position, as depicted in FIG. 2. The thickness of the closed end 15 of the hollow insert is comprised between 1 mm and 4 mm, preferably comprised between 1.8 mm and 2.2 mm, more preferentially equal to 2 mm.

The valve 1 is of the self-closing type. Thus, the shut-off member 6 is at least partially positioned upstream of a valve seat 16 of the body 2 such that the pressure of the fluid in the upstream end 4 contributes to keeping the shut-off member 6 in its closed position, in contact with the valve seat 16 via a seal 17.

The seal 17 is borne by the shut-off member 6 or by the valve seat 16 of the body 2. In the embodiment depicted in FIGS. 1 to 3, the seal 17 is borne by the shut-off member 6. The seal 17 is formed from an elastomer and/or thermoplastic material, and is preferably formed of thermoplastic elastomer polyester, more preferentially formed of Hytrel (registered trade name).

The shut-off member 6 comprises a stem 18 slidably mounted in the body 2 and ahead 19 of a shape that complements that of the valve seat 16 of the body 2. The stem 18 is made of metal, preferably of stainless steel or of brass. The head 19 is positioned upstream of the valve seat 16, the stem 18 being mounted downstream of the head 19. In the embodiment depicted in FIGS. 1 to 3, the seal 17 is borne by the head 19 and the stem 18 is cylindrical. The hollow 20 formed in the hollow insert is of cylindrical shape and has a diameter greater than that of the stem 18 of the shut-off member 6. The depth of the hollow 20 is greater than the travel of the stem 18 between the position for opening the circuit 3 and the position for closing the shut-off member of the circuit 3. Thus, it can be guaranteed that upon the irreversible deformation of the deformable member 9, the stem 18 and therefore the shut-off member 6 will slide into the position for closing the circuit 3.

In this embodiment, the predetermined threshold at which the force applied by the shut-off member 6 to the deformable member 9 causes irreversible deformation of the deformable member 9 is below the minimum buckling force for the stem 18. More specifically, the minimum buckling force for the stem 18 is that for the stem 18 as mounted in the valve 1 when the shut-off member 6 is in the position for opening the circuit 3. Thus, the deformable member 9 has to undergo irreversible deformation before the stem 18 experiences buckling.

The valve 1 comprises a first return member 21 for returning the shut-off member 6 to the closed position. More specifically in this embodiment, the first return member 21 is a first spring positioned between the body 2 and the shut-off member 6. The first spring is for example made of stainless steel. As depicted in FIGS. 1 to 3, the first spring is positioned between the body 2 and the head 19 of the shut-off member 6. Thus, when the valve 1 is in the closed position, the first spring applies a force additional to that of the fluid that holds the shut-off member 6 against the valve seat 16. As a result, the sum of the predetermined threshold and of the force exerted by the first spring on the shut-off member 6 when the shut-off member 6 is in the position for opening the circuit 3 is less than the minimum buckling force for the stem 18. Thus, the deformable member 9 has to undergo irreversible deformation before the stem 18 experiences buckling.

Moreover, because the force applied by the first spring to the shut-off member 6 is added to that exerted by the pressurized fluid on the shut-off member 6, the predetermined threshold can be set simply by adjusting the stiffness of the first spring. Thus, if the desire is to lower the predetermined threshold that leads to irreversible deformation of the deformable member 9, the stiffness of the first spring is increased. Conversely, if the desire is to raise the predetermined threshold that leads to irreversible deformation of the deformable member 9, the stiffness of the first spring is decreased.

The valve 1 also comprises a second return member 22 for returning the pusher 10 to the position of rest of the control member 8. The second return member 22 is, for example, a second spring positioned between the body 2 and the pusher 10. The second spring is for example made of stainless steel. The second spring is guided in the housing 12 of the pusher 10. Thus, when the valve 1 moves from the open position-depicted in FIG. 2—to the closed position—depicted in FIG. 1—, the second spring applies a force which tends to return the pusher 10 and thus the control member 8 to a position of rest.

The valve 1 also comprises a radial seal 23 which is positioned between the stem 18 and the body 2. The seal 23 is for example formed from an elastomer material and makes it possible to maintain the sealing against the pressurized fluid present in the circuit 3, even when the stem 18 is sliding in the body 2.

FIG. 4 schematically depicts a tank 24 comprising a valve 1 as described hereinabove. For example, the filling pressure for the tank 24 is at least 0.5 MPa, preferably at least 1.5 MPa. In this embodiment, the tank 24 is a pressurized gas cylinder. Thus, the pressurized fluid is gaseous, and preferably predominantly contains a combustible gas, more preferentially predominantly contains acetylene—or $C_2H_2$—, and even more preferentially still, contains at least 99% acetylene. The upstream end 4 of the valve 1 is connected to the pressurized gas cylinder. For this purpose, the corresponding end of the body 2 of the valve 1 may be threaded.

In variants which have not been depicted, the valve upstream end 4 may be connected to piping connected to a tank such as a pressurized gas cylinder or to several tanks such as pressurized gas cylinders, for example a bundle of pressurized gas cylinders.

The operation of the valve 1 is described hereinafter.

When the control member 8 is in a position of rest, the shut-off member 6 is also in a position for closing the circuit 3, and the circuit 3 is closed, as depicted in FIG. 1.

When the pressurized fluid needs to be distributed from the upstream end 4 to the downstream end 5, the control member 8 is switched over from the position of rest to an active position. The pusher 10 then presses against the shut-off member 6, more specifically against the stem 18, via the deformable member 9. The shut-off member 6 then slides in the body 2. More specifically, the stem 18 slides in the body 2 until the pusher 10 is pressing against the body 2. The head 19 is driven in the upstream direction and thus allows pressurized fluid the freedom to pass in the circuit 3. The shut-off member 6 is thus in the position for opening the circuit 3, as depicted in FIG. 2.

In normal operation, when the passage of pressurized fluid in the circuit 3 is to be cut off, the control member 8 is switched over from the active position to the position of rest. The second return member 22 then returns the pusher 10 and the deformable member 9 to the position of rest. Because the pusher 10 is no longer pressing against the shut-off member 6 and more specifically against the stem 18, by means of the deformable member 9, the pressurized fluid and the first return member 21 then act on the shut-off member 6 which slides into the position for closing the circuit 3, as depicted in FIG. 1.

When the valve 1 is open, as depicted in FIG. 2, a force applied by the pressurized fluid to the shut-off member 6 may exceed the predetermined threshold when an undesirable event affecting the pressurized fluid occurs in the part of the circuit 3 upstream of the shut-off member 6, such as, for example, a spontaneous decomposition of acetylene or a violent combustion of oxygen or of nitrous oxide. The deformable member 9 deforms irreversibly under the action of the shut-off member 6 and thus allows the shut-off member 6 to slide into the position for closing the circuit 3, as depicted in FIG. 3. More specifically in this embodiment, the stem 18 de forms and punctures the closed end 15 of the deformable member 9. Because the pusher 10 is no longer pressing against the shut-off member 6 and more specifically against the stem 18, by means of the deformable member 9, the pressurized fluid and the first return member 21 then act on the shut-off member 6 which slides into the position for closing the circuit 3, as depicted in FIG. 3. Because the control member 8 is still in the active position, the circuit 3 is thus closed automatically. Thereafter, even if the control member 8 is switched back over to the position of rest, the shut-off member 6 remains in the position for closing the circuit 3. Finally, because of the irreversible deformation of the deformable member 9, the valve 1 cannot be reused to open the circuit 3. Specifically, even if the control member 8 is switched back over into the active position, the pusher 10 is then no longer capable of pressing against the shut-off member 6 via the deformable member 9 and of causing it to slide into the position for opening the circuit 3. Specifically, the irreversible deformation of the deformable member 9 eliminates a mechanical link in the transfer of force between the control member 8 and the shut-off member 6. Thus, the shut-off member 6 can no longer be urged toward its position for opening the circuit 3. For example, this irreversible deformation prevents functional contact, for example pressing thrust, between the control member 8 and the shut-off member 6, more specifically between the pusher 10 of the control member 8 and the stem 18 of the shut-off member 6, via the deformable member 9.

The invention is not restricted to the embodiments set out hereinabove; other possible combinations are defined by the claims.

Other embodiments will become clearly apparent to those skilled in the art. It is notably possible for the deformable member 9 to be made up of one or more other materials and/or to be of a different shape, provided that the deformable member 9 has adequate mechanical characteristics to allow it to press against the shut-off member 6, notably in terms of mechanical integrity, resistance to abrasion and to wear, throughout the lifetime of the valve 1, while being configured to deform in order thus to allow the shut-off member 6 to slide into the position for closing the circuit 3 when subjected to a determined force.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur. Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCES

- 1: valve
- 2: body
- 3: circuit
- 4: upstream end

5: downstream end
6: shut-off member
8: control member
9: deformable member
10: pusher
11: the for
12: housing
14: opening
15: closed end
16: valve seat
17: seal
18: stem
19: head
20: hollow
21: first return member
22: second return member
23: seal
24: tank

What is claimed is:

1. A valve for a pressurized fluid, comprising a body incorporating a fluid circuit having an upstream end configured to be placed in communication with at least one tank of pressurized fluid and a downstream end configured to be placed in communication with a user of fluid, the circuit comprising a shut-off member mounted with the ability to slide in the body, the shut-off member allowing the closing or opening of the circuit, the valve comprising a shut-off member control member controlling the valve shut-off member, the shut-off member being mounted with the ability to slide in the body between a position for closing the circuit when the control member is in a position of rest, and a position for opening the circuit when the control member is in an active position, the valve comprising a deformable member interposed between the shut-off member and the control member, the deformable member being configured, when the control member is moved from the position of rest to the active position, to press against the shut-off member and cause it to slide into the position for opening the circuit, and to deform irreversibly under the action of the shut-off member when a force applied by the pressurized fluid to the shut-off member exceeds a predetermined threshold, and thus allow the shut-off member to slide into the position for closing the circuit.

2. The valve of claim 1, wherein the control member comprises a pusher sliding in the body, the deformable member being interposed between the pusher and the shut-off member.

3. The valve of claim 2, wherein the deformable member is a hollow insert placed inside a housing of the pusher.

4. The valve of claim 3, wherein the hollow insert is pot-shaped with: an opening facing toward a closed end of the housing of the pusher; and a closed end, the opposite end from the opening, configured to press against the shut-off member and cause it to slide into the position for opening the circuit when the control member is moved from the position of rest to the active position.

5. The valve of claim 4, wherein the thickness of the closed end of the hollow insert is comprised between 1 mm and 4 mm.

6. The valve of claim 2, which comprises a second return member for returning the pusher to the position of rest of the control member.

7. The valve of claim 1, and of the self-closing type, the shut-off member being at least partially positioned upstream of a valve seat of the body such that the pressure of the fluid in the upstream end contributes to keeping the shut-off member in the closed position, in contact with the valve seat via a seal.

8. The valve of claim 7, wherein the shut-off member comprises a stem slidably mounted in the body and a head of a shape that complements that of the valve seat of the body, the head being positioned upstream of the valve seat, the stem being mounted downstream of the head.

9. The valve of claim 8, wherein the predetermined threshold is below the minimum buckling force for the stem.

10. The valve of claim 1, which comprises a first return member for returning the shut-off member to the closed position.

11. A tank or a collection of tanks for pressurized fluid, comprising a valve as claimed in claim 1.

* * * * *